(12) United States Patent
Kotlizky et al.

(10) Patent No.: US 8,261,585 B2
(45) Date of Patent: Sep. 11, 2012

(54) QUICK RELEASE MECHANISM WITH INTEGRATED/ATTACHED MULTI-TOOL

(75) Inventors: Guy Kotlizky, Kfar-Shemaryahu (IL); Gal Raz, Zoran (IL)

(73) Assignee: TriG Cycling Ltd., Kfar-Shemaryahu (IL)

( * ) Notice: Subject to any disclaimer, the term of this patent is extended or adjusted under 35 U.S.C. 154(b) by 43 days.

(21) Appl. No.: 12/292,112

(22) Filed: Nov. 12, 2008

(65) Prior Publication Data

US 2009/0115146 A1    May 7, 2009

Related U.S. Application Data (60) Division of application No. 11/724,286, filed on Mar. 15, 2007, now abandoned, which is a continuation-in-part of application No. PCT/IL2006/001473, filed on Dec. 21, 2006.

(60) Provisional application No. 60/754,200, filed on Dec. 28, 2005.

(51) Int. Cl.
    *E05B 71/00* (2006.01)
    *F16H 57/00* (2012.01)

(52) U.S. Cl. ........... 70/233; 70/201; 70/225; 301/110.5; 301/124.2

(58) Field of Classification Search .......... 292/348, 292/165, 350, 352, 355, DIG. 27, 159, 169, 292/240; 403/322.4, 150–159; 74/528, 536, 74/551.3, 551.7, 567
See application file for complete search history.

(56) References Cited

U.S. PATENT DOCUMENTS

| | | | | |
|---|---|---|---|---|
| 235,005 A * | 11/1880 | Osenbruck et al. | ............. | 131/86 |
| 349,479 A * | 9/1886 | Casebolt | ....................... | 104/221 |
| 1,483,454 A * | 2/1924 | Kraft | ............................. | 285/332 |
| 2,473,937 A * | 6/1949 | Cameron | ..................... | 292/348 |
| 2,677,984 A * | 5/1954 | Juy | ................................ | 411/432 |
| 3,248,142 A * | 4/1966 | Schackerman | ............... | 292/238 |
| 3,990,118 A * | 11/1976 | Strickland et al. | ......... | 623/23.39 |
| 4,028,915 A | 6/1977 | Stahl | | |
| 4,400,038 A * | 8/1983 | Hosokawa | ................ | 301/124.2 |
| 4,621,873 A | 11/1986 | Weinstein et al. | | |
| 4,724,692 A * | 2/1988 | Turin et al. | ..................... | 70/225 |
| 5,080,407 A * | 1/1992 | Evers | ........................... | 292/241 |
| 5,291,763 A | 3/1994 | Cuisinot | | |
| 5,357,643 A | 10/1994 | Seals | | |
| 5,479,836 A * | 1/1996 | Chang | .......................... | 74/551.1 |
| 5,526,661 A * | 6/1996 | Lin | ................................. | 70/233 |
| 5,544,379 A | 8/1996 | Chen | | |
| 5,664,904 A * | 9/1997 | Hapgood et al. | .............. | 403/389 |

(Continued)

FOREIGN PATENT DOCUMENTS

GB    2161533    1/1986

(Continued)

OTHER PUBLICATIONS

Official Action Dated Oct. 9, 2008 From the US Patent Office Re.: U.S. Appl. No. 11/724,286.

(Continued)

*Primary Examiner* — Thomas Beach
*Assistant Examiner* — Alyson M Merlino (57) ABSTRACT

A quick release mechanism including a shaft having a first end cap and a second end cap is provided. The second end cap is attached to, or associated with, a lever designed and configured for actuating the quick release mechanism between closed and open positions and for use as a bicycle repair tool.

2 Claims, 7 Drawing Sheets

U.S. PATENT DOCUMENTS

| | | | |
|---|---|---|---|
| 5,813,258 A * | 9/1998 | Cova et al. | 70/225 |
| 5,875,662 A | 3/1999 | Denby et al. | |
| 5,961,186 A * | 10/1999 | Phillips | 301/124.2 |
| 6,260,931 B1 * | 7/2001 | Stewart | 301/124.2 |
| 6,349,958 B1 | 2/2002 | Gawlik | |
| 6,408,659 B1 * | 6/2002 | Chang | 70/19 |
| 6,454,363 B1 * | 9/2002 | Vignocchi et al. | 301/124.2 |
| 6,465,363 B1 * | 10/2002 | Kasai | 438/716 |
| 6,574,817 B2 | 6/2003 | Wu | |
| 6,742,849 B1 * | 6/2004 | Denby | 301/124.2 |
| 6,758,380 B1 * | 7/2004 | Kolda | 224/315 |
| 6,761,417 B2 * | 7/2004 | Denby | 301/124.2 |
| 6,792,877 B2 * | 9/2004 | Gutgsell et al. | 108/50.02 |
| 7,047,847 B2 | 5/2006 | Chuang | |
| 7,384,209 B2 * | 6/2008 | Muders et al. | 403/115 |
| 2005/0050642 A1 * | 3/2005 | Lee | 7/138 |
| 2007/0252347 A1 | 11/2007 | Kotlizky et al. | |

FOREIGN PATENT DOCUMENTS

| | | |
|---|---|---|
| WO | WO 2007/074439 | 7/2007 |
| WO | WO 2008/111053 | 9/2008 |

OTHER PUBLICATIONS

Official Action Dated Jul. 14, 2008 From the US Patent Office Re.: U.S. Appl. No. 11/724,286.

International Search Report and the Written Opinion Dated Jan. 14, 2009 From the International Searching Authority Re.: Application No. PCT/IL2008/000323.

Official Action Dated Oct. 9, 2008 From the US Patent and Trademark Office Re.: U.S. Appl. No. 11/724,286.

International Search Report and the Written Opinion Dated Aug. 13, 2008 From the International Searching Authority Re.: Application No. PCT/IL06/01473.

Invitation to Pay Additional Fees Dated Oct. 28, 2008 From the International Searching Authority Re.: Application No. PCT/IL08/00323.

Official Action Dated Jul. 14, 2008 From the US Patent and Trademark Office Re.: U.S. Appl. No. 11/724,286.

International Preliminary Report on Patentability Dated Jan. 21, 2010 From the International Bureau of WIPO Re.: Application No. PCT/IL2008/000323.

* cited by examiner

QUICK RELEASE MECHANISM WITH INTEGRATED/ATTACHED MULTI-TOOL

RELATED APPLICATIONS

This present application is a divisional of pending U.S. patent application Ser. No. 11/724,286, filed on Mar. 15, 2007, which is a continuation-in-part of PCT Patent Application No. PCT/IL2006/001473, filed on Dec. 21, 2006, which claims the benefit of U.S. Provisional Patent Application No. 60/754,200, filed on Dec. 28, 2005 the contents of which are hereby incorporated by reference.

FIELD AND BACKGROUND OF THE INVENTION

The present invention relates to a quick release mechanism and, more particularly, to a bicycle wheel or seatpost quick release mechanism which incorporates a bicycle multi-tool and optionally an integrated anti-theft mechanism.

Bicycles are provided with quick release mechanisms for the seat post and wheels which enable quick and easy removal/adjustment of wheels and/or seat post without use of tools. A conventional type of quick release includes a hand-operated lever which controls a cam for releasing and securing the seat to the frame, or the wheels to the frame/fork of the bicycle.

Since quick release mechanism facilitate removal of wheels and seatpost from the bicycle they also ease the task of the thief in removing the seat or wheels. As a consequence, to prevent theft, it has become common practice for the cyclist to remove the wheel and the seatpost when the bike is parked in public; this practice is extremely inconvenient for the rider.

To reduce the likelihood of theft, several quick release locking mechanisms have been described in the prior art (see for example, U.S. Pat. Nos. 5,291,763; 4,028,915; and 4,621,873). Although such devices substantially reduce the ability of the thief to remove the wheels and/or seatpost from the bicycle frame, such devices which are either integrated into the quick release mechanism or attached thereto are bulky, unsightly and require the use of a key.

Multi tools are often used by cyclist to adjust and/or repair bicycle components. Such multi-tools can be used to tighten hex bolts, adjust derailleur screws, repair broken chains and the like and are typically used by the cyclist for roadside repair. Although small multi-tool devices can be easily carried by the cyclist in a back pocket or pouch, some cyclists forget to carry such devices or prefer not to carry them because of the added burden.

While reducing the present invention to practice, the present inventors have designed a quick release mechanism which incorporates both a locking mechanism and multi-tool functionality while retaining the form factor and functionality of a standard quick release mechanism.

SUMMARY OF THE INVENTION

According to one aspect of the present invention there is provided a quick release mechanism comprising a shaft having a first end cap and a second end cap, the second end cap being attached to a lever designed and configured for actuating the quick release mechanism between closed and open positions, the lever being further designed and configured for use as a bicycle repair tool.

According to further features in preferred embodiments of the invention described below, the lever is removable from the second end cap.

According to still further features in the described preferred embodiments the lever includes a key element, such that removal of the lever from the second end cap which preferably includes a key hole type configuration prevents actuation of the quick release mechanism between the closed and the open positions.

According to still further features in the described preferred embodiments the lever includes at least one tool selected from the group consisting of a hex key, a hex socket, a chain tool, a screw driver, a tire lever and a spoke wrench. Other tools which may be used to extract or tighten bolts such as torx head bolts as well as pliers, cutting heads and the like can also be incorporated into the lever.

According to still further features in the described preferred embodiments the lever is removable from the second end cap only when the quick release mechanism is in the closed position.

According to still further features in the described preferred embodiments the key element of the lever only engages a specific lock configuration disposed within the second end cap. The second end cap can include a simple key hole configuration (e.g. notches, grooves, indentations) or a magnetic lock element which is actuated by a magnet disposed on or in the lever.

According to another aspect of the present invention there is provided a hex key tool comprising a body configured with at least one end portion capable of engaging a hex bolt and a lock engaging element for engaging a specific lock configuration.

The present invention successfully addresses the shortcomings of the presently known configurations by providing a quick release mechanism which incorporates a locking mechanism into the release lever and in addition provides multi-tool functionality.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 11a-c illustrate release of a multi-tool configured lever from the shaft of a quick release mechanism constructed in accordance with the teachings of the present invention.

DESCRIPTION OF THE PREFERRED EMBODIMENTS

The present invention is of a quick release mechanism which can be used as a multi-tool/anti-theft device.

The principles and operation of the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Numerous configurations of quick release mechanism are known in the art. Although quick release mechanism incorporating an anti-theft mechanism are also known, most are bulky and require a separate key to operate. Various configurations of multi-tools are also known and although some include bike mounting hardware, none are incorporated into existing bicycle hardware elements.

The present inventors have designed a quick release mechanism which incorporates multi-tool and anti-theft functionality into the quick release mechanism without substantially altering the configuration and operation of the quick release mechanism.

Thus, according to one aspect of the present invention there is provided a quick release mechanism which can be used to secure a wheel or seat post or any other removable bike element to the bike frame, much the same as any standard quick release mechanism and yet can also function as an anti-theft device and a multi-tool.

Figures 1, 2, 3, 4, 5, 6:
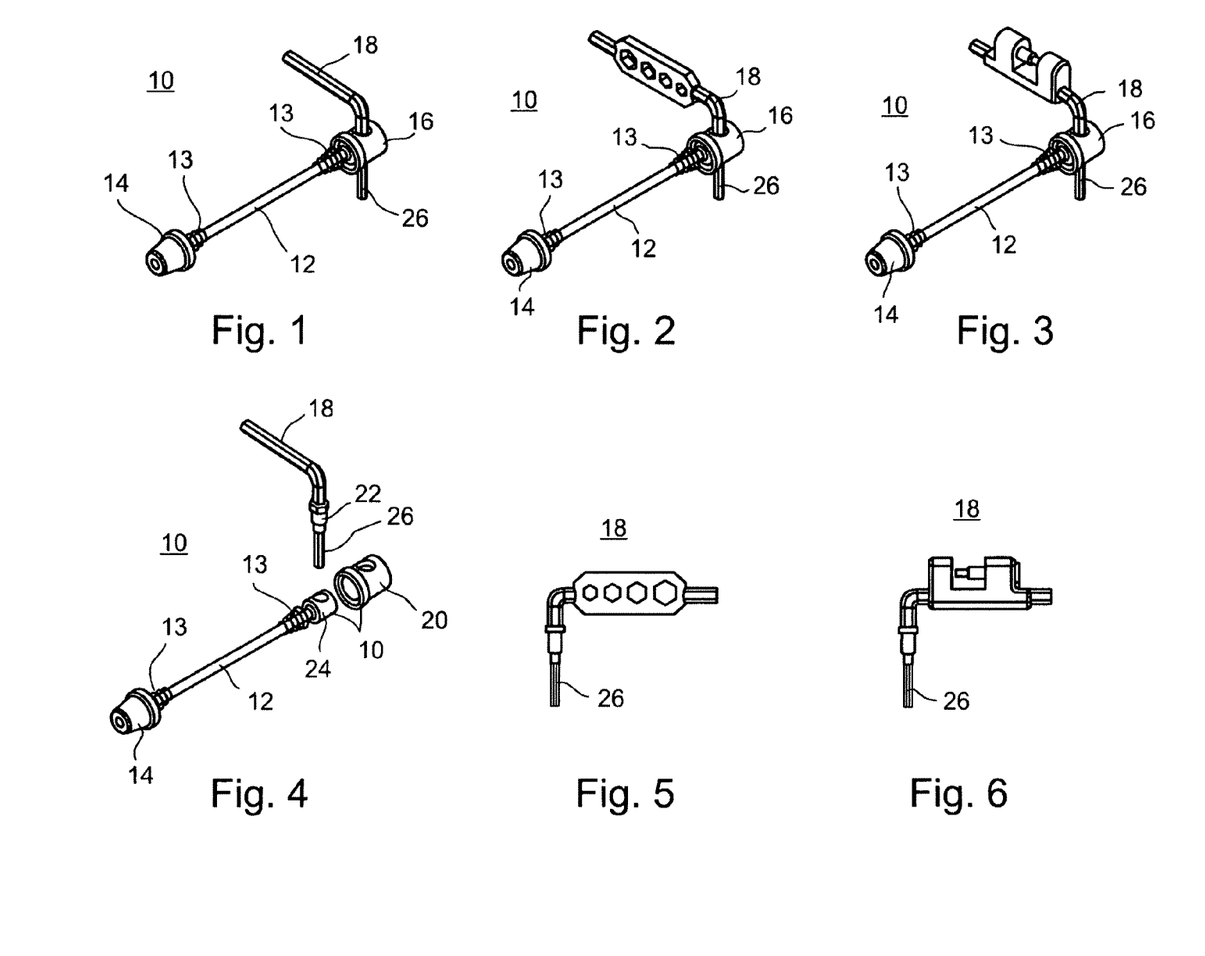
FIGS. 1-3 are isometric drawings illustrating several embodiments of the quick release mechanism of the present invention having a hex wrench type lever (FIG. 1), a combination hex wrench-socket wrench lever (FIG. 2) and a combination hex wrench-chain tool type lever (FIG. 3).
FIG. 4 illustrates an exploded view of the quick release mechanism of FIG. 1.
FIG. 5 is a side view of the lever of the quick release mechanism shown in FIG. 2.
FIG. 6 is a side view of the lever of the quick release mechanism shown in FIG. 3.

Referring now to the drawings, FIG. 1 illustrates the quick release mechanism of the present invention which is referred to herein as quick release 10.

Quick release 10 includes a shaft 12 having a first end cap 14 and a second end cap 16. Quick release 10 can also include springs 13 fitted at ends of shaft 12 against end caps 14 and 16. Shaft 12 can be fabricated from a metal such as steel, titanium and the like using an extrusion, lathing or casting, while end caps 14 and 16 can be fabricated from a metal, a polymer or carbon fiber or any other suitable material using similar fabrication techniques. Shaft 12 preferably includes spiral threads over an end portion engaging end cap 14, such that end cap 14 can be removably attached from shaft 12 (thus enabling threading of shaft 12 through a wheel axle or bracket) and further enabling adjustment of a position of end cap 14 on the end portion of shaft 12.

Figure 7:
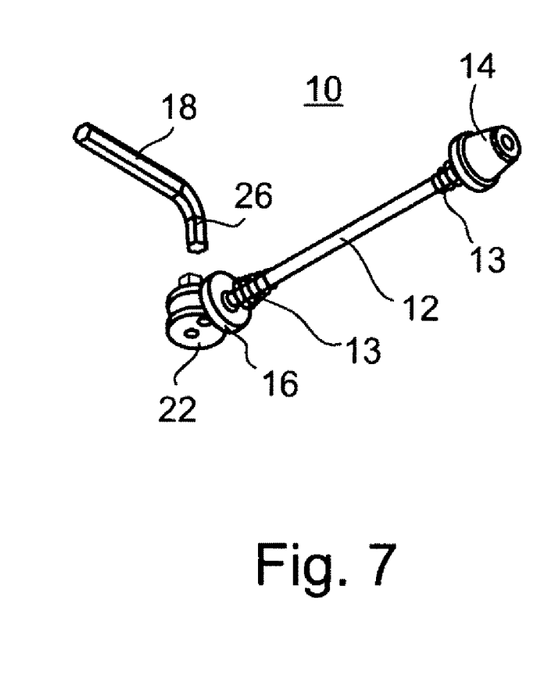
FIGS. 7-8 are isometric drawings illustrating an additional embodiment of the quick release mechanism of the present invention having an externally mounted cam mechanism and showing the lever free of the end cap (FIG. 7) and positioned in the end cap (FIG. 8).
Figure 8:
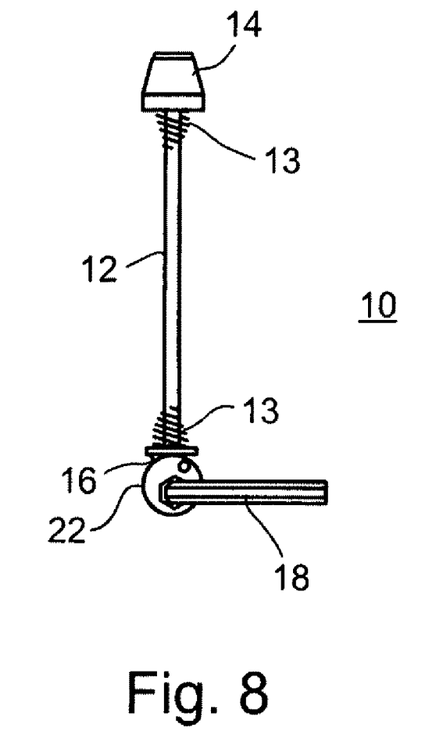

Second end cap 16 is attached to a lever 18 which is designed and configured for actuating quick release 10 between closed and open positions, i.e. it functions in translating end cap 16 in and out along a length of shaft 12, such that when actuated to a closed position, end cap 16 or a portion thereof moves inwardly (towards end cap 14) along shaft 12 and vice versa. In this respect, quick release 10 is similar to prior art quick release mechanisms. FIG. 4 illustrates the components of quick release 10 showing one embodiment of end cap 16 which enables translation of end cap portion 20 inwardly when lever 18 is closed. In this embodiment, lever 18 includes a cam 22 which when rotated pulls end cap portion 24 of end cap 16 into end cap portion 20 thus translating end cap portion 24 inwardly and as a result tightening quick release mechanism 10 against, for example, frame wheel tabs and wheel hub. It will be appreciate that other embodiments, e.g. ones including an external cam mechanism (exemplified by the outboard configuration of FIGS. 7-8 and 10) or embodiments in which cam 22 forms a part of end cap 16 are also envisaged.

Lever 18 is further designed and configured for use as a bicycle repair tool. Lever 18 can be fabricated from any hard material (e.g. steel, titanium, ceramics) using a forging process, casting, shaping, machining or forming. As is shown in FIGS. 1-3, such a tool can be a simple hex wrench (FIGS. 1 and 4) having two sides of different hex sizes (e.g. 3 and 4 mm, 4 and 5 mm, 5 and 6 mm). Such a simple configuration can also incorporate a torx wrench head(s), a screw driver head (Phillips or flat) and any other bolt or screw wrench known in the art.

As is shown in FIGS. 2-3 and 5-6, lever 18 can also incorporate additional or alternative tools, such as hex keys (FIGS. 2 and 5) or a chain tool (FIGS. 4 and 6). Additional tools such as spoke wrenches or pliers can also be incorporated into any of the above described lever 18 configurations. FIGS. 9-11c illustrate a lever 18 design which integrates a chain tool, a spoke wrench (slot at end of chain tool pin bolt) and hex key; an additional L-shaped tool (with opposing hex and screwdriver heads) is removably attached to top of lever 18.

Lever 18 is preferably removably attached from end cap 16 such that it can be used as a tool without necessitating removal of quick release 10 from the bicycle. To that effect, lever 18 preferably includes a retention mechanism which ensures that lever 18 does not accidentally detach from end cap 16 under riding conditions. Such a retention mechanism can be a pin, a spring loaded ball, a friction mechanism or a magnetic element which are either attached to lever 18 at an end portion 26, or it can be incorporated into end cap 16. In any case, the retention mechanism is selected such that it is easily activatable to release lever 18 from end cap 16 and yet can retain lever 18 within end cap 16 even under the harshest riding conditions.

As is mentioned hereinabove, simple prior art quick release mechanisms are limited in that they facilitate theft of bicycle components attached to the bicycle frame via a quick release mechanism.

To overcome such a limitation, lever 18 of quick release 10 can also incorporate a key element which specifically mates to a keyhole mechanism disposed within end cap 16. Such a mechanism can include, for example, a series of ridges disposed within end cap 16 which ridges engage a complementary series of grooves on lever 18. Thus, when in a locked position, lever 18 can be removed preventing use of an ordinary hex wrench to open quick release 10. Other configurations can include a locking pin which connects lever 18 to end cap 16 or a spring loaded pin which is disposed within end cap 16 and engaged by an indentation or groove on lever 18 when it is inserted into end cap 16.

Figure 9:
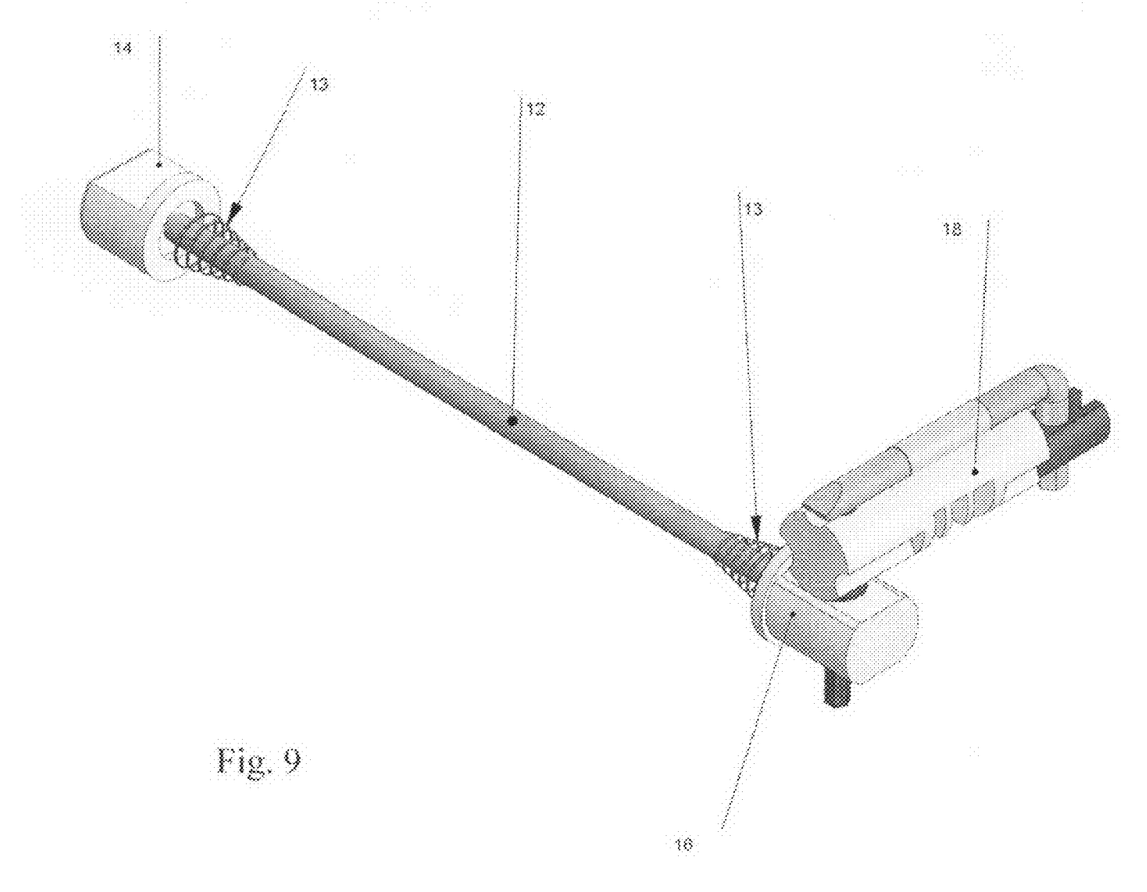
FIGS. 9-10 are perspective drawings of two configurations of the quick release mechanism of the present invention having an inboard (FIG. 9) and outboard (FIG. 10) locking mechanism.
Figure 10:
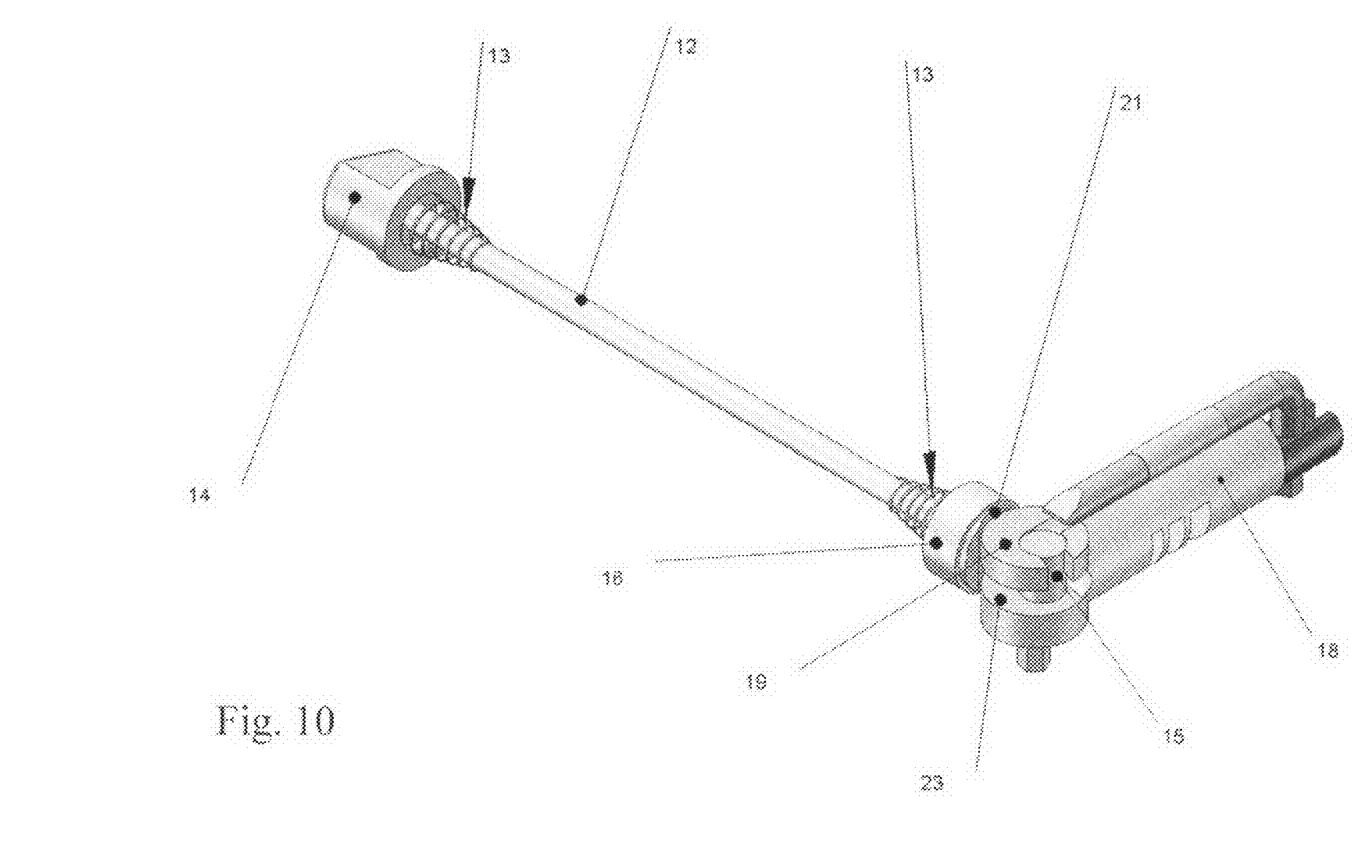

FIGS. 9-10 illustrate inboard and outboard configurations of quick release 10. In an inboard configuration, the (eccentric) cam is positioned within end cap 16, whereas in an outboard configuration, the cam is positioned outside and adjacent to end cap 16. Examples of prior art inboard configurations include Shimano XT and XTR quick release mechanisms, whereas prior art outboard configurations are exemplified by Kore Wheel Skewers and Salsa Flip Offs.

In the inboard configuration of quick release 10 (FIG. 9), lever 18 end cap 16 and shaft 12 are constructed as is shown in FIG. 4. In the outboard configuration of quick release 10 (FIG. 10), shaft 12 includes a t-bar end 15 which fits into a groove 17 within lever 18. Lever 18 incorporates a cam-shaped protrusion 19, which when rotated pushes against a groove 21 in end cap 16, thus translating end cap 16 inward (towards wheel). In this respect, quick release 10 of FIG. 10 is similar in function to prior art outboard quick release mechanisms.

Figure 11A:
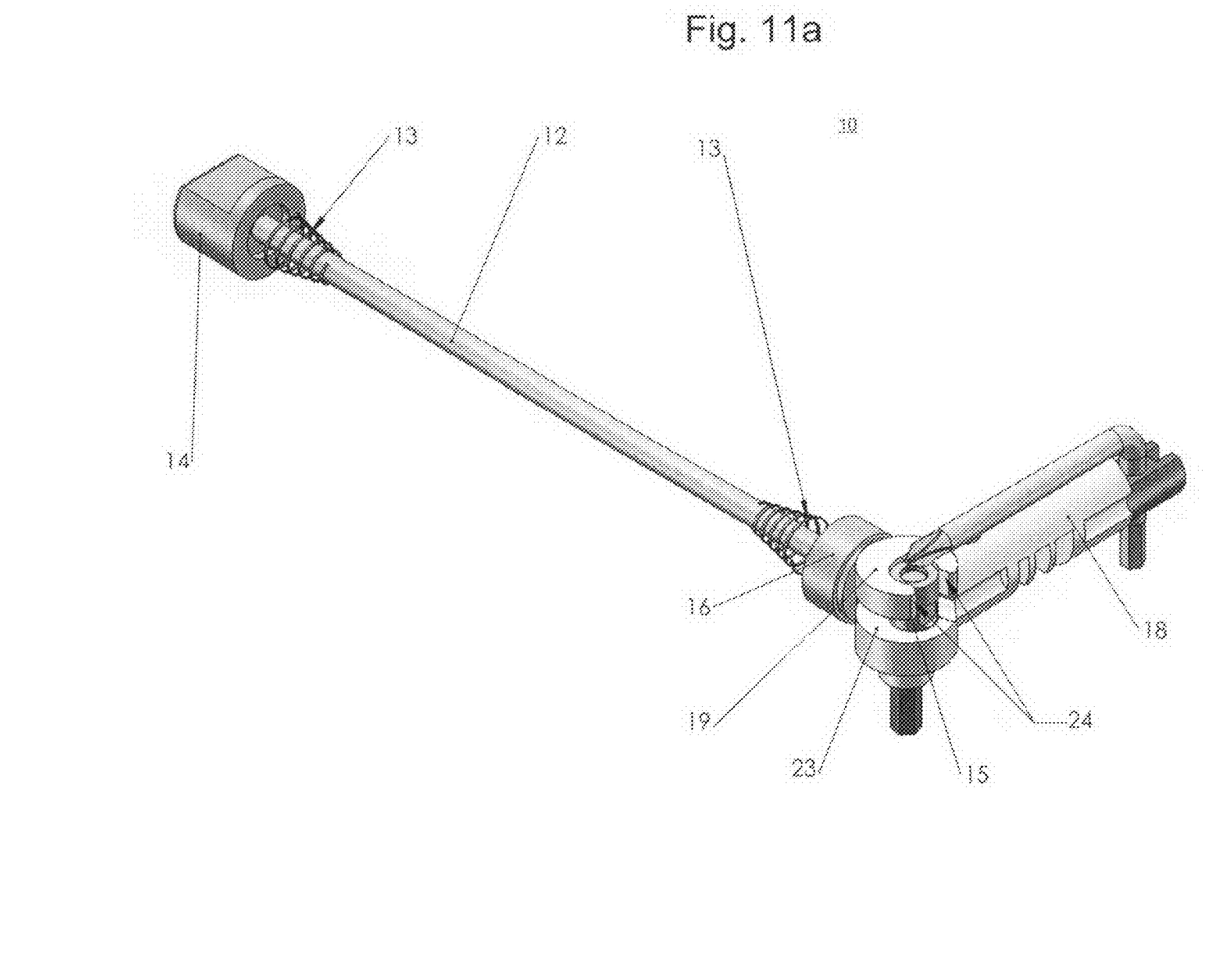
Figure 11B:
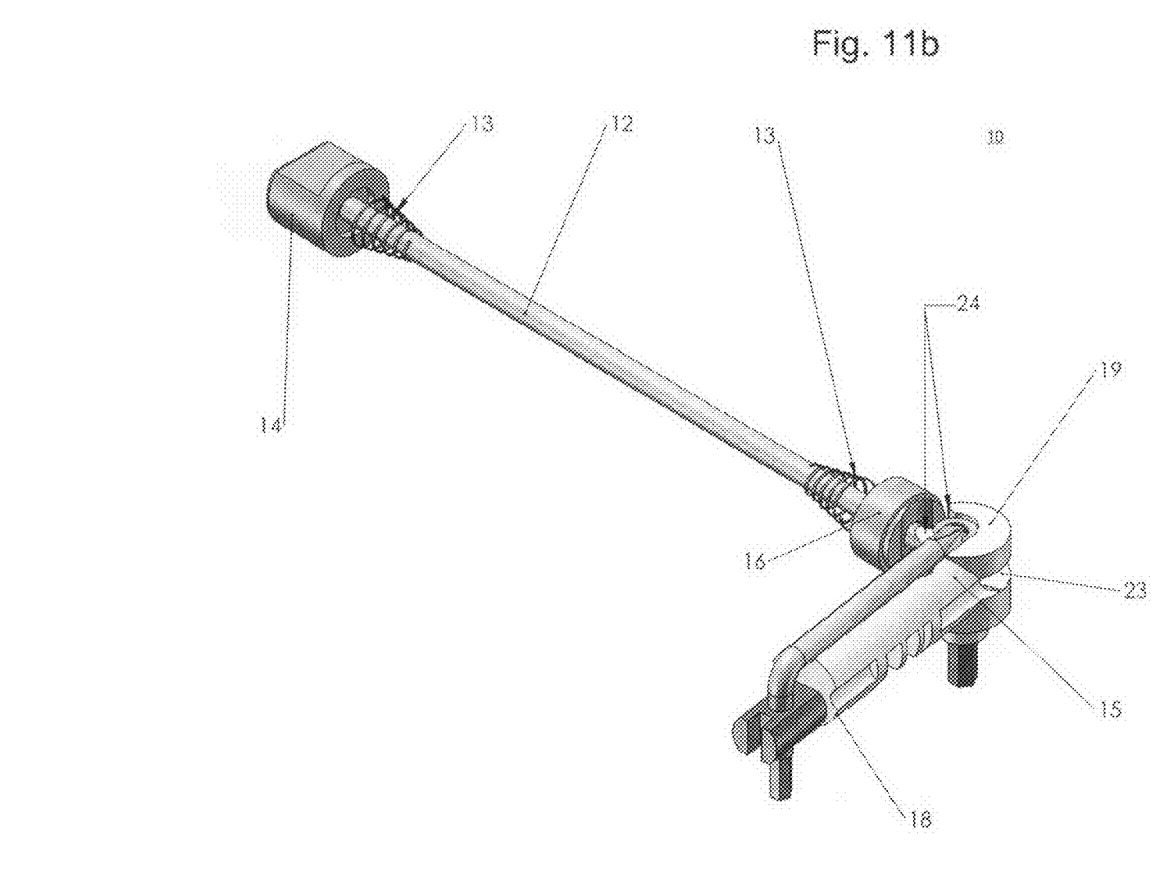
Figure 11C:
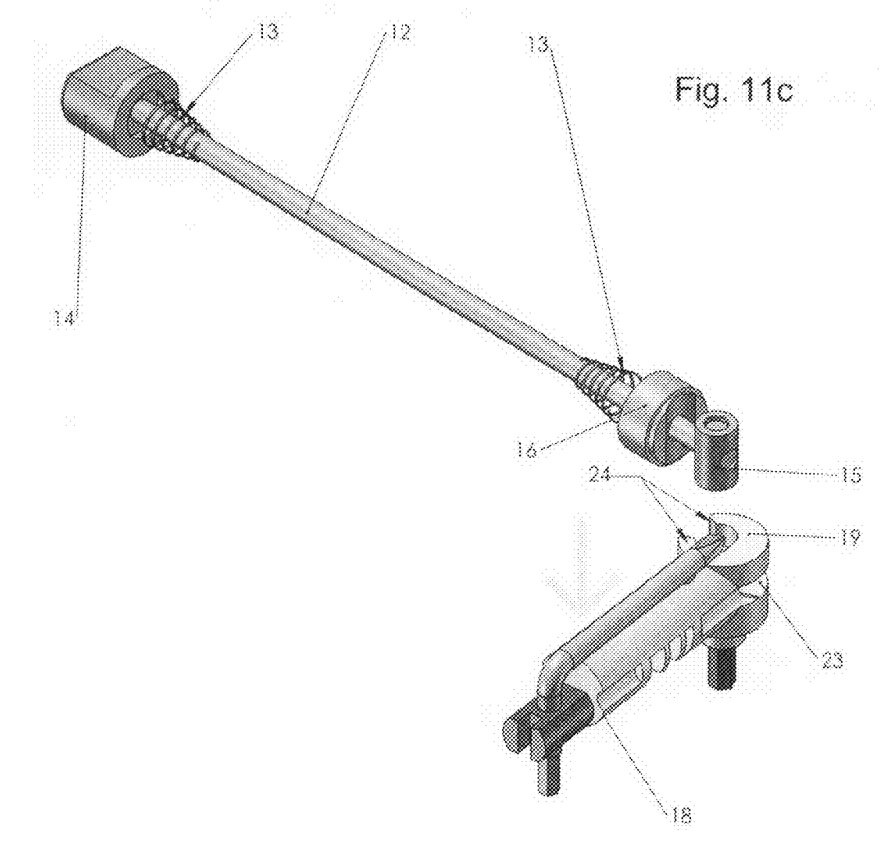

As is shown in FIGS. 11a-c, to remove lever 18 from shaft 12, a user simply rotates lever 18 to an open position (180 degrees from the closed position shown in FIG. 10) such that groove 23 can be released (downward) from t-bar end 15 of shaft 12 and lever 18 freed from quick release 10. To facilitate removal, the top half of cam-shaped protrusion 19 includes a notch 24. When notch 24 is aligned with shaft 12 (when lever 18 is in a fully open position in the embodiment shown in FIGS. 11a-c) lever 18 can be released from t-bar end 15 by simply sliding lever 18 downwards (in direction of arrow).

Thus, the present invention provides a quick release mechanism which includes both multi-tool and lock functionality while retaining a form factor similar to that of ordinary quick release mechanisms. As is shown by the configurations depicted in FIGS. 9-10, such a quick release mechanism can provide the cyclist with a chain tool, Allen wrenches, flat head screwdriver and a spoke wrench. Additional configurations can also include a tire bead extraction tool, a Phillips head screwdriver, as well as, a torx wrench and the like.

It will be appreciated that since a typical bicycle can include three separate quick release mechanisms (two wheels and a seatpost), a complete set of bicycle tools (e.g. chain tool, three hex wrenches, a screw driver, a spoke wrench etc) can be provided by utilizing several distinct configurations of quick release 10.

Such configurations can be provided in a kit form which would cover all the quick release forms needed on a bicycle and at the same time provides a complete multi-tool functionality and anti-theft security.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A quick release mechanism comprising a shaft having a first end and a second t-bar end and a lever having a groove, said t-bar end fitting within said groove thereby enabling said lever to pivot around said t-bar end and actuate the quick release mechanism between closed and open positions, wherein said lever is removable from said shaft by aligning a notch in said lever with said shaft and sliding said t-bar end out of said groove in said lever without removing said t-bar end from said shaft, and further wherein said lever includes at least one tool selected from the group consisting of a hex key, a screw driver, a spoke wrench and a chain tool.

2. A quick release mechanism comprising a shaft having a first end and a second t-bar end, an end cap disposed on said shaft inward of said t-bar end and a lever having a groove, said end cap being spaced from said t-bar end when said lever is mounted on said shaft with said t-bar end fitting within said groove, said lever being capable of pivoting around said t-bar end to actuate the quick release mechanism between closed and open positions, wherein said lever includes a cam-shaped protrusion which translates said end cap inward along said shaft when said lever is rotated to a closed position and further wherein said lever is removable from said shaft by aligning a notch in said lever with said shaft and sliding said t-bar end out of said groove in said lever without removing said t-bar end from said shaft.

* * * * *